United States Patent [19]

Senoo

[11] Patent Number: 4,577,328

[45] Date of Patent: Mar. 18, 1986

[54] METHOD AND CIRCUIT FOR DETECTING A TRAINING SIGNAL

[75] Inventor: Keiichi Senoo, Tokyo, Japan

[73] Assignee: NEC Corporation, Tokyo, Japan

[21] Appl. No.: 547,264

[22] Filed: Oct. 31, 1983

[30] Foreign Application Priority Data

Oct. 30, 1982 [JP] Japan .................................. 57-190028

[51] Int. Cl.$^4$ ......................... H03H 7/30; H03H 7/40
[52] U.S. Cl. ......................................... 375/13; 333/18
[58] Field of Search ........................ 375/11, 12, 13, 14; 333/18; 364/724

[56] References Cited

U.S. PATENT DOCUMENTS

| 3,715,665 | 2/1973 | Chang | 375/13 |
| 3,978,407 | 8/1976 | Forney, Jr. et al. | 375/13 |
| 4,004,226 | 1/1977 | Qureshi et al. | 375/13 |
| 4,027,250 | 5/1977 | Lang | 375/13 |

Primary Examiner—Robert L. Griffin
Assistant Examiner—Stephen Chin
Attorney, Agent, or Firm—Sughrue, Mion, Zinn, Macpeak and Seas

[57] ABSTRACT

Receipt of a training signal by a circuit wherein a demodulated data sequence is compared with a corresponding pre-recorded sequence and an impulse produced upon coincidence therebetween, is acknowledged by two consecutive signals occuring at a time interval corresponding to the period of the data sequence.

2 Claims, 9 Drawing Figures

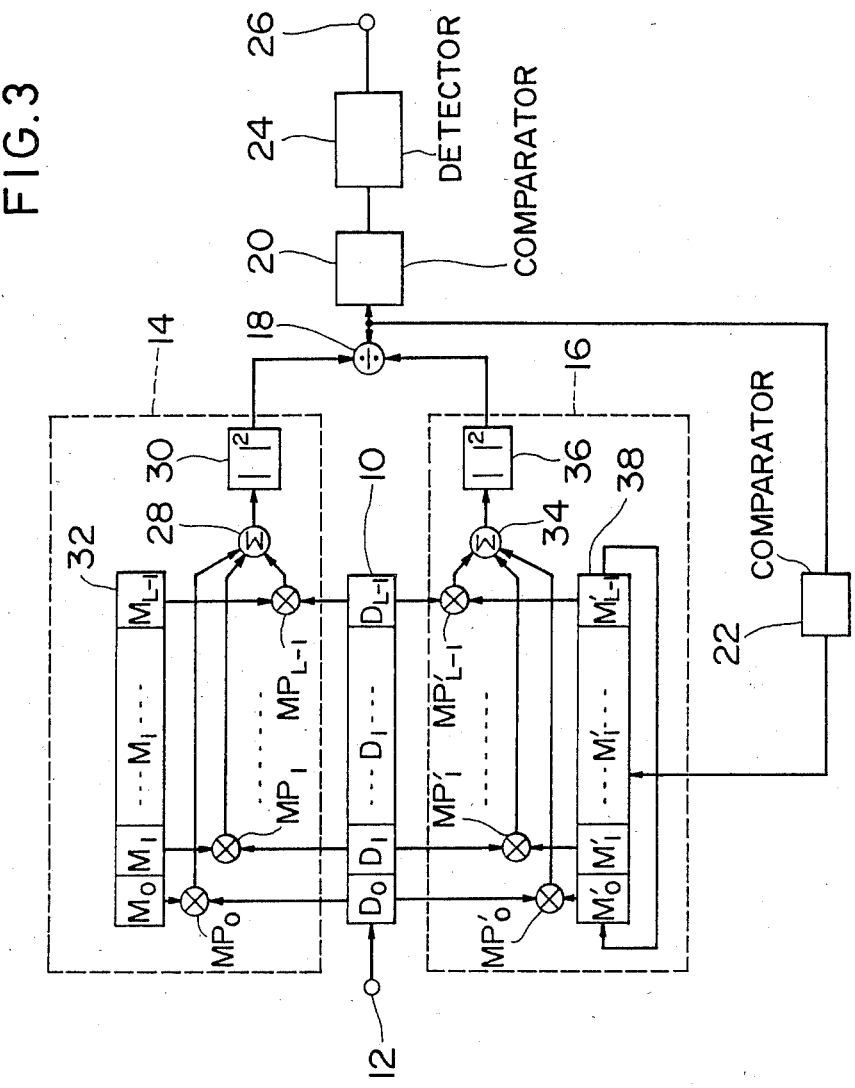

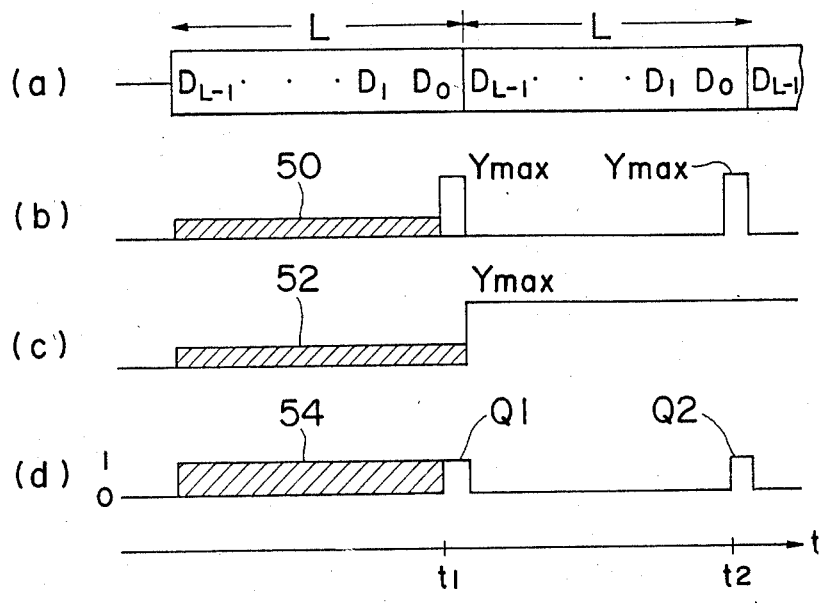
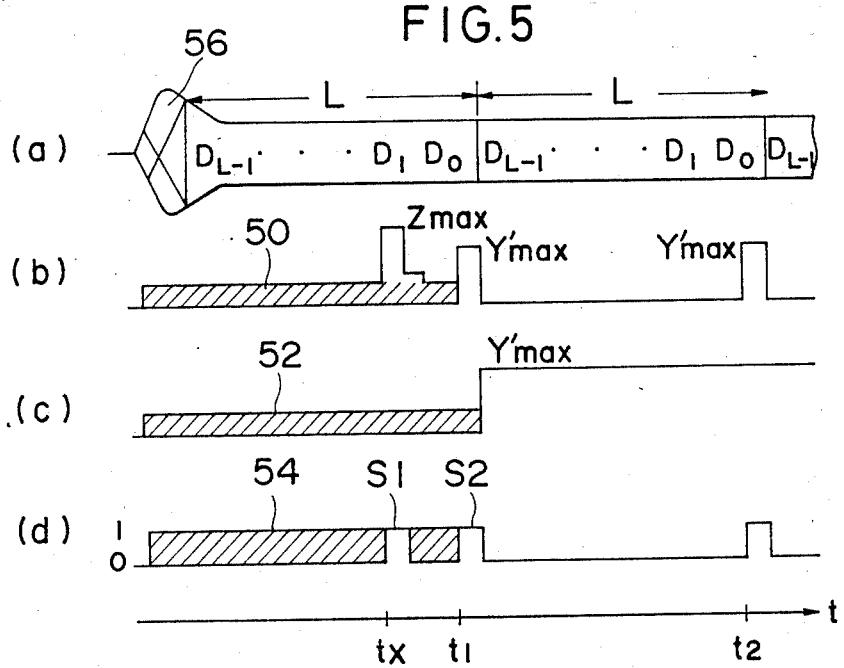

METHOD AND CIRCUIT FOR DETECTING A TRAINING SIGNAL

BACKGROUND OF THE INVENTION

1. Field of the Invention

This invention relates to a method and circuit for detecting a training signal which is transmitted for initial adjustment of the equalizing characteristics of an automatic equalizer provided in a Modem (Modulator-Demodulator).

2. Description of the Prior Art

In a Modem having therein an automatic equalizer, it is a common practice to transmit a training signal, prior to the transmission of message data, to a receiving Modem for initial adjustment of the automatic equalizer with respect to channel characteristics. The CCITT (International Consultative Committee for Telephone and Telegraph) has proposed such a training signal in "Recommendation V.27 bis". This signal consists of three segments which precede the message data in a manner schematically shown in FIG. 1. The first segment is composed of continuous 180° phase reversals for 14 symbol intervals, the second segment of 0°-180° 2-phase equalizer conditioning pattern for 58 symbol intervals, and the third segment of continuous scrambled ONEs for 8 symbol intervals.

Such a training signal however consumes a large amount of time for initial adjustment of the automatic equalizer and hence the efficiency of a data transmission system is seriously limited especially when the adjusting time approaches or exceeds the actual message time.

In order to overcome this problem, another training signal has been proposed in the European Patent Application publication No. A1 0052362. This training signal is composed of at least two periodic data sequences (maximum length sequences) each having a period L and is such that the autocorrelation function of the sequence assumes an impulse. This training signal will be described in more detail hereinlater.

SUMMARY OF THE INVENTION

The object of this invention is to provide a method and circuit for effectively detecting the training signal as disclosed in the above mentioned application.

According to one aspect of this invention, the present invention takes the form of a method of detecting a training signal for use in initial adjustment of an automatic equalizer with respect to channel characteristics, comprising the steps of: (a) receiving and shifting a demodulated training signal in synchronism with data modulating rate, the training signal comprising at least two periodic data sequences each having a period L and the autocorrelation function of the periodic data sequence assumes an impulse; (b) calculating the correlation between the demodulated training signal and a first periodic data sequence with the period L, and obtaining a first square value indicative of the correlation; (c) calculating the correlation between the demodulated training signal and a second periodic data sequence and obtaining a second square value indicative of the correlation, wherein the second periodic data sequence is circulated in synchronism with the data modulating rate and has the same sequence as the first data sequence; (d) dividing the first square value by the second square value; (e) comparing the quotient obtained in the step (d) with a first and second threshold values; (f) setting the order of the second periodic data sequence to the order of the first periodic data sequence shifted by one, if the quotient exceeds the second threshold value; (g) producing a signal if the quotient exceeds the first threshold value; and (h) detecting the presence of the training signal by detecting sequential signals occuring at a time interval equal to the period L.

According to another aspect of this invention, the present invention takes the form of a circuit for detecting a training signal for use in initial adjustment of an automatic equalizer with respect to channel characteristics, comprising: a first means for receiving and shifting a demodulated training signal in synchronism with data modulating rate, the training signal comprising at least two periodic data sequences each having a period L and the autocorrelation function of the periodic data sequence assumes an impulse; a second means for calculating the correlation between the demodulated training signal and a first periodic data sequence with the period L, and obtaining a first square value indicative of the correlation; a third means for calculating the correlation between the demodulated training signal and a second periodic data sequence and obtaining a second square value indicative of the correlation, wherein the second periodic data sequence is circulated in synchronism with the data modulating rate and has the same sequence as the first data sequence; a fourth means for dividing the first square value by the second square value; a fifth means for comparing the quotient produced by the fourth means with a first and second threshold values; a sixth means for setting the order of the second periodic data sequence to the order of the first periodic data sequence shifted by one, if the quotient exceeds the second threshold value; a seventh means for producing a signal if the quotient exceeds the first threshold value; and an eighth means for detecting the presence of the training signal by detecting sequential signals occuring at a time interval equal to the period L.

BRIEF DESCRIPTION OF THE DRAWINGS

The features and advantages of the present invention will become more clearly appreciated from the following description taken in conjunction with the accompanying drawings in which like blocks or circuits are denoted by like reference numerals and in which:

FIG. 3 shows in block diagram form a circuit according to the present invention;

FIG. 4 is a time chart showing schematically (a) two periodic data sequences, (b) the output of a first correlation circuit, (c) the output of a second correlation circuit and (d) the resulting output of a comparator operatively connected with the aforementioned correlation circuits;

FIG. 5 is a time chart similar to that shown in FIG. 4 but which illustrates the operation which occurs when a deviation occurs in the demodulated signal;

DETAILED DESCRIPTION OF THE PREFERRED EMBODIMENTS

The principle underlying this invention will first be discussed.

Figure 6:
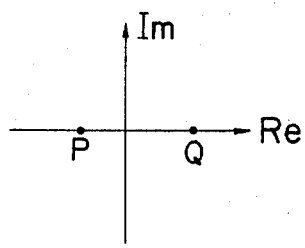
FIGS. 6 and 7 show complex planes which illustrate the real and the imaginary parts of the correlation and the distance which occurs as a result of noncoincidence between the demodulated signal and prestored data.
Figure 7:
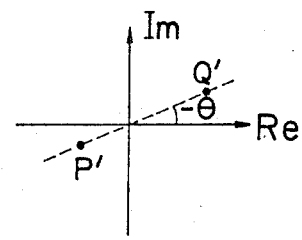

The training signal which the present invention utilizes is comprised of at least two periodic data sequences each having a period L and wherein the autocorrelation function of the sequence assumes an impulse. More specifically, the periodic data sequence (maximum length sequence) is represented by way of example:

(for L=15) Q Q Q P P P P Q P Q P P Q Q P (for L=23) Q Q Q Q P P P P P Q P Q P P Q Q P P Q Q P Q P wherein if the data Q and P are respectively assigned to data points on a complex plane (see FIGS. 6 and 7) such that the data Q is ((Real Part: Re), (Imaginary Part: Im))=(q, 0) and the data P is (Re, Im)=(p, 0) where:

$$q = \left(1 + \frac{1 + \sqrt{L+1}}{L}\right) / \sqrt{1 + \frac{1}{L}}$$

$$p = \left(-1 + \frac{1 + \sqrt{L+1}}{L}\right) / \sqrt{1 + \frac{1}{L}} \quad (1)$$

then, the autocorrelation function $\rho$ (i) of the sequence becomes $$\begin{rcases} \text{(for } i = 0\text{)} \\ \rho(0) = \frac{L+1}{2} p^2 + \frac{L-1}{2} q^2 = L \\ \text{(for } i \neq 0\text{)} \\ \rho(i) = \frac{L+1}{2} qp + \frac{L+1}{4} p^2 + \frac{L-3}{4} q^2 = 0 \end{rcases} \quad (2)$$

Further, if $\theta$ is the phase deviation between the modulated and demodulated carriers, then we have $$\begin{rcases} Q' = Q\,e^{-j\theta} \\ P' = P\,e^{-j\theta} \end{rcases} \quad (3)$$

Under these conditions, from the equations (2) and (3), we obtain the correlation between the demodulated data sequence and the known periodic data sequence with the period L:

$$\begin{rcases} \text{(for } i = 0\text{)} \; Re[\rho'(0)] = L \cdot Re[e^{-j\theta}] \\ \phantom{\text{(for } i = 0\text{)} \;} Im[\rho'(0)] = L \cdot Im[e^{-j\theta}] \\ \text{(for } i \neq 0\text{)} \; Re[\rho'(i)] = 0 \cdot Re[e^{-j\theta}] = 0 \\ \phantom{\text{(for } i \neq 0\text{)} \;} Im[\rho'(i)] = 0 \cdot Im[e^{-j\theta}] = 0 \end{rcases} \quad (4)$$

Accordingly, the sum of the squares of the real and imaginary parts for each of i=0 and $\neq 0$ of the equation (4) becomes $$\begin{rcases} \text{(for } i = 0\text{)} \; (Re[\rho'(0)])^2 + (Im[\rho'(0)])^2 = L^2 \\ \text{(for } i \neq 0\text{)} \; (Re[\rho'(i)])^2 + (Im[\rho'(i)])^2 = 0 \end{rcases} \quad (5)$$

Figure 1:
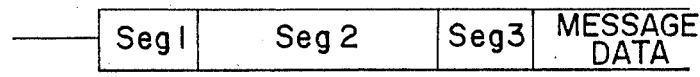
FIG. 1 shows in schematic form the known training signal and message data discussed in the opening paragraphs of the present disclosure.
Figure 2:
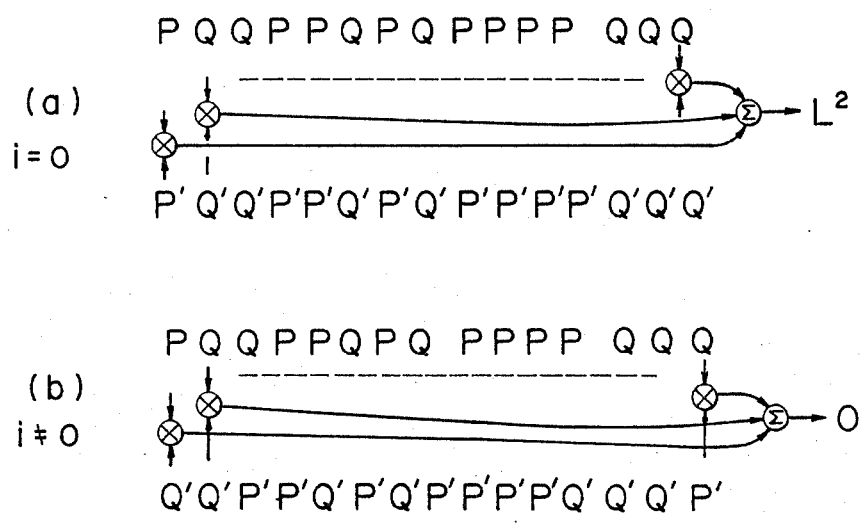
FIGS. 2(a) and 2(b) show examples wherein (a) the demodulated signal and prestored data coincide to produce a signal for detection of a training signal being received and (b) the coincidence is not achieved.

FIGS. 2(a) and 2(b) are respective illustrations wherein i=0 and i$\neq$0 in equation (5).

It is therefore understood from the equation (5) that the sum of the squares of the real and imaginary parts of the correlation assumes:

(a) a maximum value $L^2$ when the demodulated training signal coincides with the predetermined periodic data sequence (i.e. when i=0); and (b) "0" in the other cases (i.e. when i$\neq$0).

The preferred embodiment of this invention is hereinafter described with reference to FIGS. 3 through 5.

FIG. 3 is a block diagram of the circuit arrangement according to this invention and FIGS. 4 and 5 are waveforms explaining the operation of the FIG. 3 arrangement.

The arrangement of FIG. 3 generally comprises a shift register 10 for receiving a demodulated signal via an input terminal 12, first and second correlation circuits 14 and 16, a divider 18, first and second comparators 20 and 22, a detector 24, and an output terminal 26 of the arrangement, all of which are coupled as shown.

The shift register 10 is provided with L shift stages (viz., a number corresponding to the length of a periodic data sequence $M_i$ which is further described later) and successively receives and shifts the demodulated data sequence $D_i$ (wherein $D_i$ is a complex number and i=0, 1, ..., L−1) in synchronism with the data modulation rate. The first correlation circuit 14 comprises L multipliers $MP_0$ through $MP_{L-1}$, an adder 28, a square circuit 30 and a memory means 32 (a ROM for example) in which the first periodic data sequence $M_i$ with the period L (wherein $M_i$ is a real number, and i=0, 1, ..., L−1) is previously stored. The correlation circuit 14 calculates the square of the distance of the correlation between the modulated data sequence $D_i$ and the periodic data sequence $M_i$. More specifically, the correlation circuit 14 calculates the following value:

$$\left[Re\left(\sum_{i=0}^{L-1} D_i \cdot M_i\right)\right]^2 + \left[Im\left(\sum_{i=0}^{L-1} D_i \cdot M_i\right)\right]^2 \quad (6)$$

The second correlation circuit 16 comprises L multipliers $MP'_0$ through $MP'_{L-1}$, an adder 34, a square circuit 36, and a circulating register 38 in which a periodic data sequence $M_i'$ having the period L (wherein $M_i'$ is a real number and i=0, 1, ..., L−1) is stored. The circulating register 38 shifts and circulates the stored data sequence $M_i'$ in synchronism with the modulating rate. It should be noted that the sequence order of the data sequence $M_i'$ is equal to one of the circulated orders of the data sequence $M_i$. The correlation circuit 16 calculates the square of the distance of the correlation between the modulated data sequence $D_i$ and the periodic data sequence $M_i'$. More specifically, the correlation circuit 16 calculates the following value:

$$\left[Re\left(\sum_{i=0}^{L-1} D_i \cdot M_i'\right)\right]^2 + \left[Im\left(\sum_{i=0}^{L-1} D_i M_i'\right)\right]^2 \quad (7)$$

The divider 18 divides the output of the correlation circuit 14 by that of the second correlation circuit 16 and applies the result to the comparators 20 and 22. The comparator 20 compares the output of the divider 18 with a first threshold value and generates a logic "1" if the output of the divider 18 exceeds the threshold value. While, the comparator 22 compares the output of the divider 18 with a second threshold value. If the output of the divider 18 exceeds the second threshold value, the comparator 22 supplies the circulating register 38 with a control signal. The register 38 is responsive to the applied control signal and is set to a predetermined sequence order which corresponds to the order of the fixed data sequence $M_i$ but which has been shifted by one.

The operation of the FIG. 3 arrangement will be described in more detail with reference to FIGS. 4 and 5.

Each of the memory elements or shift stages of the shift register 10 is initially set to "0". A training signal consisting of more than two periodic data sequences $M_i$ each having the period L, is demodulated and applied to the shift register 10 in synchronism with the data modulation rate, i.e. in each modulation time slot. The demodulated training signal is represented as a periodic data sequence $D_i$ ($i = L-1, \ldots, 1, 0$) in FIG. 4(a). The first correlation circuit 14 outputs the maximum values Ymax at each period L (i.e. at time points $t_1, t_2, \ldots$) as shown in FIG. 4(b). When the first correlation circuit 14 outputs the first maximum value Ymax at $t_1$, divider 18 generates a signal with a magnitude exceeding the threshold values of both comparators 20 and 22. Thus, the comparator 20 produces a logic "1" denoted by Q1 (FIG. 4(d)), while the comparator 22 applies the aforementioned control signal to the circulating register 38 and induces the circulating register 38 to assume the aforementioned sequence order. Therefore, the second correlation circuit 16 continuously generates the maximum value Ymax because the comparator 22 no longer produces the control signal. When the correlation circuit 14 produces the second Ymax at $t_2$, the comparator 20 generates a logic "1" (Q2) in response to the Ymax. The detector 24 coupled to the comparator 20 detects the presence of the training signal by detecting sequentially logic "1"s which occur with the time interval L therebetween.

It will be noted that during the period that the intially 37 0" set memory elements are being one by one filled with demodulated data, the output of the correlation circuits 14 and 16 are not zero and fluctuate within the hatched zones 50, 52 and thus assume what shall be referred to as "low" values. Accordingly, the output of the comparator 20 fluctuates between "1" and "0" (as shown by the hatched zone 54) depending on the magnitude of the outputs of the correlation circuits 14 and 16 within the hatched zones 50, 52. These output fluctuations do not adversely affect the operation according to this invention.

Referring now to FIG. 5, there is shown waveforms depicting the operation of the FIG. 3 arrangement in the event that the demodulated training signal suffers from waveform distortion. It is often the case in practice that the demodulated training signal is distorted due to a transient response such as a precursor or start-up of automatic gain control (AGC), as denoted by a reference numeral 56. The waveform distortion leads to unstabilities of the outputs of the correlation circuits 14 and 16. Under these circumstances the correlation circuit 14 may produce a large value Zmax relative to the maximum value Y'max at a time point $t_x$ when the incoming data sequence does not coincide with the data sequence $M_i$. Under these conditions any number of possibilities may occur, however for simplicity of explanation let it be assumed that at time $t_x$ the correlation circuit 14 outputs a high level Zmax and that the correlation circuit 16 maintains the previously mentioned "low" level output, then as shown in FIG. 5(d) a high level signal S1 will be outputted by the comparator 20 in the hatched zone as shown. However, as the memory elements or shift stages are still not completely full and still contain some intial "0" values, until after the high level signal S2, a "0" level output which persist for a period L cannot be expected.

Figure 8:
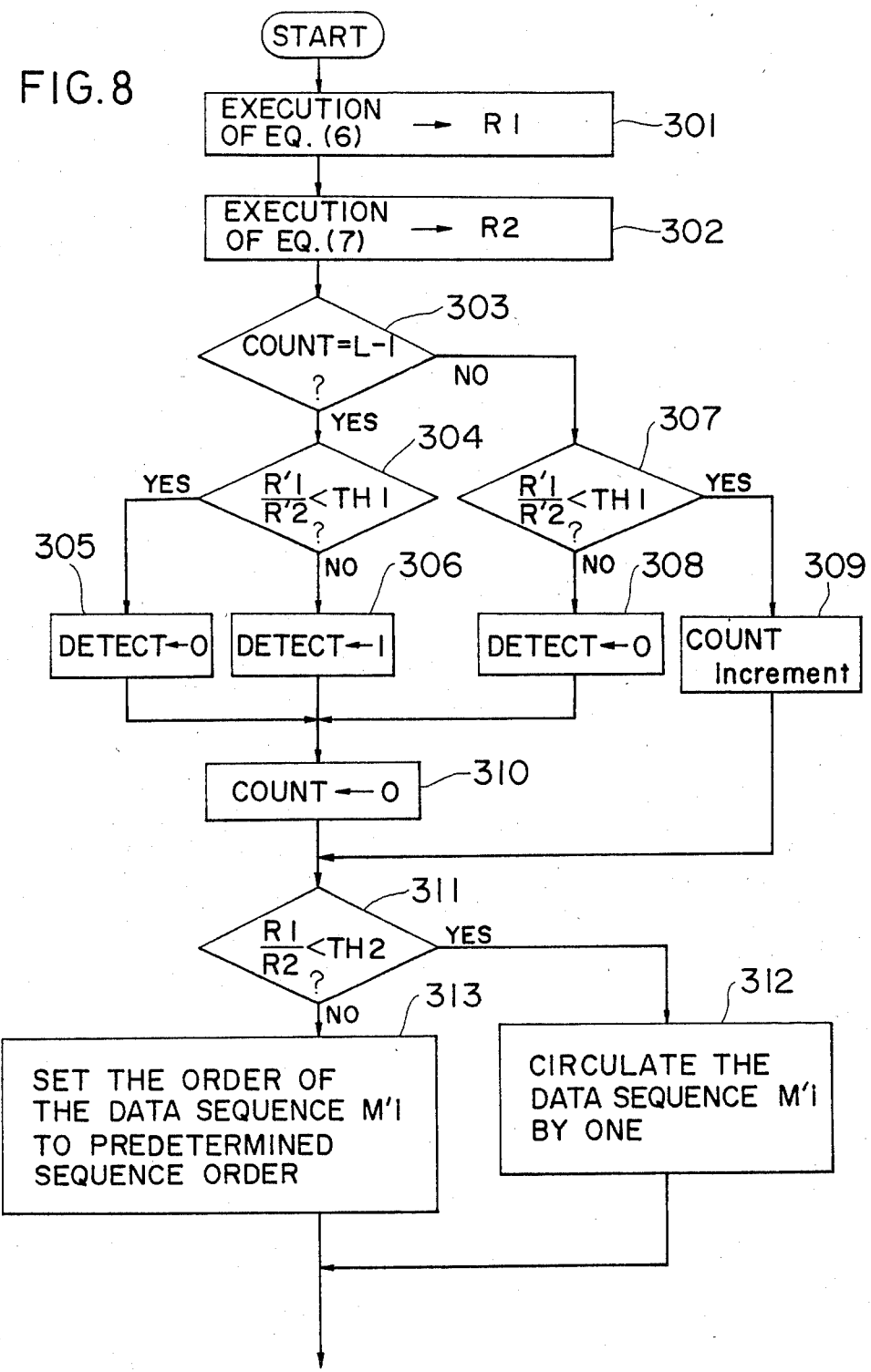
FIG. 8 is a flow chart illustrating a program which may be employed in a microprocessor forming part of a second embodiment of the present invention.

Turning now to FIG. 8, there is shown a flowchart describing the operation in the case a microprocessor is utilized as the detecting circuit of this invention.

The demodulated training signal (i.e. the incoming data sequence) is successively stored in a RAM (Random Access Memory) per modulation time slot. RAMs denoted "COUNT" and "DETECT" in the flowchart are initialized to "0"s. The program of the FIG. 8 flowchart is executed within one modulating time slot.

At step 301, equation (6) is executed using the demodulated data sequence stored in the RAM and the first periodic data sequence $M_i$ stored in the ROM. The result of the operation is stored in a RAM R1. At next step 302, the equation (7) is executed using the demodulated data sequence stored in the RAM and the second periodic data sequence $M_i'$. The result of the operation is stored in a RAM R2. The content of the "COUNT" RAM (which is used in this instance as a counter RAM) is checked at step 303 to determine if it is equal to (L−1). If the answer is NO the program proceeds to step 307 to determine if (R'1/R'2) is less than the first threshold value "TH1" (for example, 0.5) of the comparator 20 (FIG. 3), wherein R'1 and R'2 indicate the contents of the RAMs R1 and R2 respectively. If the decision at the step 307 is YES, then the content of "COUNT" RAM is incremented by one at step 309 and the program goes to step 311. In the event that the answer to the question posed in step 307 is NO then the content of "DETECT" RAM (which in this embodiment is used as a flag RAM for indicating the presence of the training signal) is set to "0" at step 308 whereafter the program proceeds to step 310.

As will be appreciated the presence of "0" and "1" in the "DETECT" RAM respectively indicate the absence and the presence of the training signal.

Returning to step 303, if the decision thereat is YES, step 304 is executed to check if (R'1/R'2) is less than the first threshold value "TH1" similar to step 307. In the event that the answer is YES at the step 304 then "0" is set into the "DETECT" RAM at step 305 whereafter the program goes to the step 310. If No is that answer at step 304, "1" is set into the "DETECT" RAM at step 306. That is to say, the training signal is detected when (R'1/R'2) exceeds the first threshold value "TH1" after being less than "TH1" continuously for the program runs up until that which corresponds to (L−1).

At the step 310, "0" is set into the "COUNT" RAM to initalize same.

Thereafter, step 311 is executed to determine if (R'1/R'2) is less than the second threshold value "TH2" (for example, 1.0) of the comparator 22 (FIG. 3). In the event that the answer is YES the second periodic data sequence $M_i'$ is circulated by one at step 312. On the other hand, if the decision at the step 311 is NO, the order of the data sequence $M_i'$ is set to the sequence order equal to the fixed order of the sequence $M_i$ but shifted by one.

The foregoing description shows only preferred embodiment of the present invention. Various modifications are apparent to those skilled in the art without departing from the scope of the present invention which is only limited by the appended claims.

What is claimed is:

1. A method of detecting a training signal for use in initial adjustment of an automatic equalizer with respect to channel characteristics, comprising the steps of:
    (a) receiving and shifting a demodulated training signal in synchronism with data modulating rate, said training signal comprising at least two periodic data sequences each having a period L and the autocorrelation function of said periodic data sequence assumes an impulse;
    (b) calculating the correlation between said demodulated training signal and a first periodic data sequence with the period L, and obtaining a first square value indicative of said correlation;
    (c) calculating the correlation between said demodulated training signal and a second periodic data sequence and obtaining a second square value indicative of said correlation, wherein said second periodic data sequence is circulated in synchronism with the data modulating rate and has the same sequence as said first data sequence;
    (d) dividing said first square value by said second square value;
    (e) comparing the quotient obtained in the step (d) with a first and second threshold values;
    (f) setting the order of said second periodic data sequence to the order of said first periodic data sequence shifted by one, if said quotient exceeds the second threshold value;
    (g) producing a signal if said quotient exceeds the first threshold value; and
    (h) detecting the presence of said training signal by detecting said at least two periodic data sequences occuring at a time interval equal to said period L.

2. A circuit for detecting a training sigal for use in initial adjustment of an automatic equalizer with respect to channel characteristics, comprising:
    a first means for receiving and shifting a demodulated training signal in synchronism with the data modulating rate, said training signal comprising at least two periodic data sequences each having a period L and the autocorrelation function of said periodic data sequence assumes an impulse;
    a second means for calculating the correlation between said demodulated training signal and a first periodic data sequence with the period L, and obtaining a first square value indicative of said correlation;
    a third means for calculating the correlation between said demodulated training signal and a second periodic data sequence and obtaining a second square value indicative of said correlation, wherein said second periodic data sequence is circulated in synchronism with the data modulating rate and has the same sequence as said first data sequence;
    a fourth means for dividing said first square value by said second square value;
    a fifth means for comparing the quotient produced by said fourth means with a first and second threshold values;
    a sixth means for setting the sequence order of said second periodic data sequence to the sequence order of said first periodic data sequence shifted by one, if said quotient exceeds the second threshold value;
    a seventh means for producing a signal if said quotient exceeds the first threshold value; and
    an eighth means responsive to the output of said seventh means for detecting the presence of said training signal by detecting said at least two periodic data sequences occuring at a time interval equal to said period L.

* * * * *